(12) United States Patent
Chick et al.

(10) Patent No.: US 8,394,544 B2
(45) Date of Patent: Mar. 12, 2013

(54) SOLID OXIDE FUEL CELL STEAM REFORMING POWER SYSTEM

(75) Inventors: Lawrence A. Chick, West Richland, WA (US); Vincent L. Sprenkle, Richland, WA (US); Michael R. Powell, Kennewick, WA (US); Kerry D. Meinhardt, Kennewick, WA (US); Greg A. Whyatt, West Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 1342 days.

(21) Appl. No.: 12/118,353

(22) Filed: May 9, 2008

(65) Prior Publication Data

US 2009/0280369 A1  Nov. 12, 2009

(51) Int. Cl.
*H01M 8/06* (2006.01)

(52) U.S. Cl. ........ 429/425; 429/420; 429/495; 422/600; 422/629; 48/61

(58) Field of Classification Search ............... 429/425
See application file for complete search history.

(56) References Cited

U.S. PATENT DOCUMENTS

| 3,266,938 | A | * | 8/1966 | Parker et al. ............... 429/420 |
| 5,366,819 | A | * | 11/1994 | Hartvigsen et al. ........... 429/425 |
| 7,704,618 | B2 | * | 4/2010 | Venkataraman et al. ..... 429/411 |
| 2007/0160880 | A1 | * | 7/2007 | Fischer ........................... 429/19 |

* cited by examiner

*Primary Examiner* — John S Maples
(74) *Attorney, Agent, or Firm* — Derek H. Meaghan; A. J. Gokcek

(57) ABSTRACT

The present invention is a Solid Oxide Fuel Cell Reforming Power System that utilizes adiabatic reforming of reformate within this system. By utilizing adiabatic reforming of reformate within the system the system operates at a significantly higher efficiency than other Solid Oxide Reforming Power Systems that exist in the prior art. This is because energy is not lost while materials are cooled and reheated, instead the device operates at a higher temperature. This allows efficiencies higher than 65%.

4 Claims, 5 Drawing Sheets

SOLID OXIDE FUEL CELL STEAM REFORMING POWER SYSTEM

STATEMENT AS TO RIGHTS TO INVENTIONS MADE UNDER FEDERALLY SPONSORED RESEARCH AND DEVELOPMENT

This invention was made with Government support under Contract DE-AC057RL01830 awarded by the U.S. Department of Energy. The Government has certain rights in this invention.

SUMMARY OF THE INVENTION

While this application describes a particular embodiment of the invention it is to be distinctly understood that the invention is not limited to this particular embodiment but can be variously embodied in a variety of other configurations as well. The present invention is a Solid Oxide Fuel Cell Reforming Power System that utilizes adiabatic reforming of reformate within this system. By utilizing adiabatic reforming of reformate within the system the system operates at a significantly higher efficiency than other Solid Oxide Reforming Power Systems that exist in the prior art. This is because energy is not lost while materials are cooled and reheated; instead the device operates at a higher temperature. This allows efficiencies higher than 65%.

This adiabatic reforming can be accomplished in a variety of ways. In one embodiment of the invention, this is done by utilizing modules that split the number plates in a typical SOFC stack, however it will be perceptible to persons of skill in the art that the adiabatic reformation can also be achieved in other ways as well. In other embodiments of the invention this is done by including at least one separation device that selectively removes preselected materials from within said system. While particular carriers and structures are disclosed in the present preferred embodiment it is to be distinctly understood that the invention is not limited to this configuration by may be variously embodied in other forms as well. Such other systems could include $CO_2$ capture devices such as fluids, or plates that could be intermittently removed and replaced within the system. In addition to the use of this invention as a power source the invention also teaches a method and a device for carbon dioxide capture and sequestration.

Additional objects advantages and novel features of the present invention are set forth above and described below in the detailed description of one embodiment of the present invention. While various embodiments of the invention have been described it is to be distinctly understood that the invention is not limited thereto beat may be variously alternatively modified and embodied according to the needs and necessities of the user. Accordingly the descriptions herein should be construed as illustrative and not limiting in any way.

DETAILED DESCRIPTION OF INVENTION

One embodiment of the present invention is described hereafter. While this description is provided in detail it is to be distinctly understood that the invention is not limited to the particular details described but that various alternative applications of the present invention may also be envisioned within the scope of the claims of the present invention. This description therefore is intended to be descriptive of the invention and not limiting in any way.

FIGS. 1-6 show various features of various embodiments of the present invention. In the embodiment shown in FIG. 1, a highly efficient solid oxide fuel cell (SOFC) power system is described. While this system is described as being operated in conjunction with a coolant medium such as water it is to be distinctly understood that the invention is not limited thereto but may variously alternatively embodied in a variety of other types of devices, embodiments and applications as well. This system achieves efficiencies of 65% and is preferably fueled by a sulfur-free steam-reformed liquid hydrocarbon, such as S-8 or JP-10, in conjunction with an oxidant. This fuel is stored in fuel tank 16 and supplied to the system through a fuel pump 6. The oxidant is in a tank 20. Such a system has the potential to achieve an energy density of over 1200 watt-hours per liter. The SOFC power system is preferably modular, with additional units called upon to ramp from about 2 kW up to as high as 40 kW, electric power to a 100 to 200 VDC power bus at high efficiency over an operating range of 2 to 11.5 kW net output. A single fuel cell system cannot efficiently cover the full 2-to-11.5-kW range, so we are using a modular design that allows efficient power production over the full power range. By selectively energizing each of the three power-system modules 2, it is possible to achieve high efficiency operation at net output power levels of about 2.3, 4.6, 6.9, 9.2, and 11.5 kW. Operation at power levels between these "peak efficiency" points is also possible, but system efficiency will decrease slightly because the stack voltages must be reduced to achieve the intermediate power levels. The system can easily be scaled to provide more output power by increasing the number and capacity of the power-system modules 2.

Figure 1:
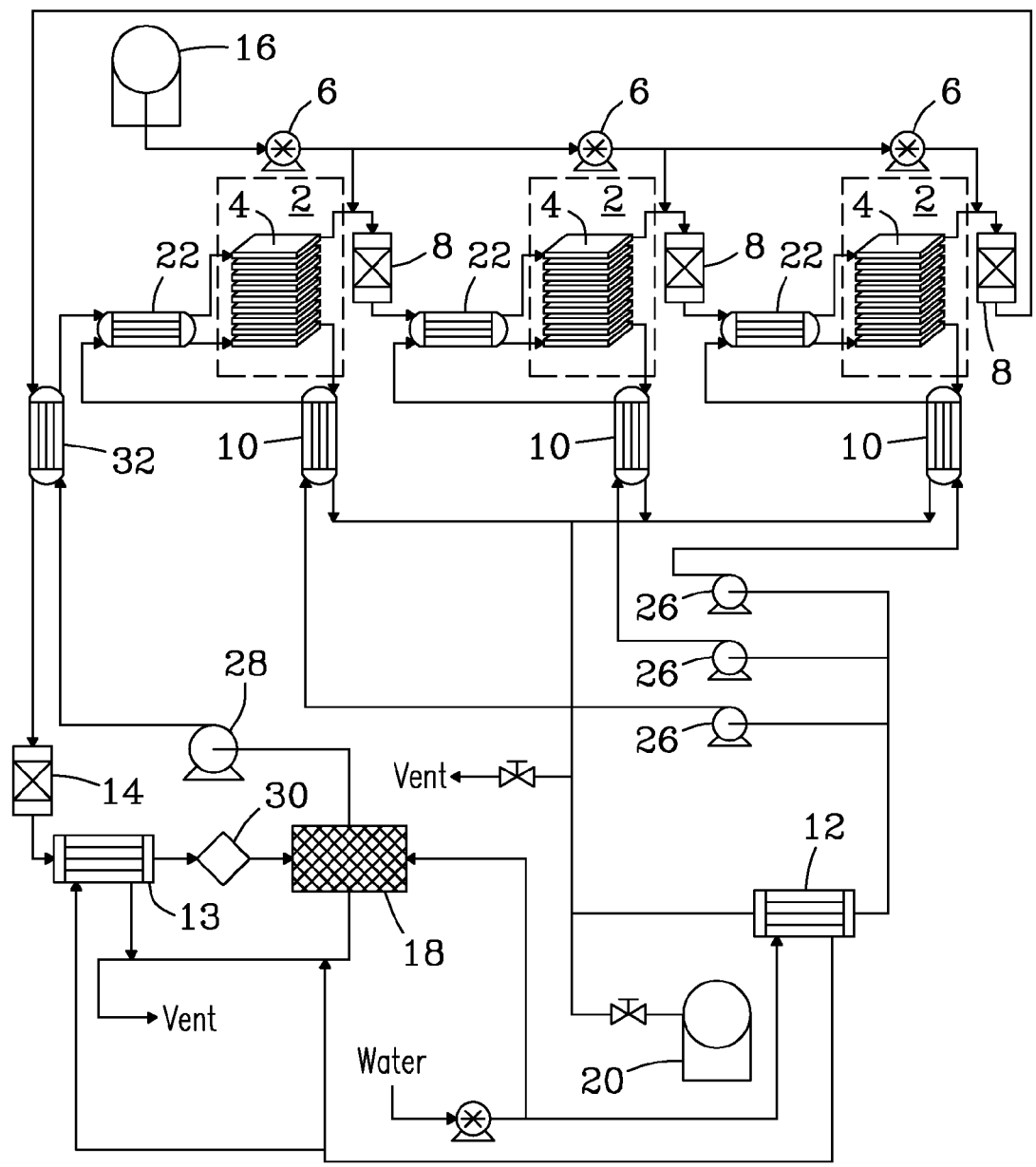
FIG. 1 shows a schematic view of a first embodiment of the present invention

Within each of the three power-system modules 2 shown in FIG. 1, there is a complete fuel-cell power system capable of operating independently of the other modules. The basic arrangement of the key system components inside each module is shown in FIG. 1. While this particular description of one embodiment of the present invention includes these parameters it is to be distinctly understood that the invention is not limited thereto but may be variously configured according to the needs and necessities of a user.

Referring now to FIG. 1, a view of a first embodiment of the present invention is shown. FIG. 1 shows modules 2 that each include at least one SOFC stack 4. Preferably, there are a plurality of SOFC stacks 4 in each module. For example, in this module 2 there are three SOFC stacks 4. In the preferred embodiment of the invention a series of three smaller stacks 4 are employed. Thus, each of the three power modules 2 contain three fuel-cell stacks 4 for a total of nine SOFC stacks in the system. These three SOFC stacks 4 are used in each module 2 to allow the addition of fuel in three separate stages. In this "3-stage fuel addition" approach, fuel is metered into the anode gas immediately downstream of each stack 4 and the resulting gas is reacted adiabatically in an adiabatic steam reformer 8 over a suitable catalyst to form a mixture of hydrogen, carbon monoxide, methane, and steam. This gas mixture then serves as the anode feed gas for the next fuel-cell stack 4 in the series. The reformate gas then exits the reactor downstream of Stack #3 and is cooled to 300° C. by the anode recuperator 32 before it contacts a water-gas-shift (WGS) catalyst in a water gas shift reactor 14 that converts approximately 80% of the carbon monoxide to carbon dioxide. This generally an exothermic process that has a minimal effect on system efficiency, but it is necessary to avoid carbon deposition in Stack #1. After exiting the WGS reactor 14, the gas is further cooled in a condenser 13 and most of the water vapor is condensed and removed. The cooled gas then flows through a microporous membrane separation device 18 which preferably contains a microporous, gas absorption membrane sized to remove approximately 90% of the carbon dioxide. Because the solubilities of the fuel gases (CO, $H_2$, and $CH_4$) in water are about 25 to 45 times lower than that of $CO_2$, only a small fraction of the fuel gases are removed by the membrane 18. With the majority of the $CO_2$ removed via the membrane 18, the resulting hydrogen-rich gas can be reheated (by a recuperative heat exchanger) and fed to the anode of Stack #1.

Each of the three stacks 4 has its cathode gas flow independently controlled by adjustment of bloc blower speed from a blower 26. This approach was selected to avoid the pressure loss associated with the use of control valves. A means of cathode-gas flow control for each stack is required to ensure the stack temperatures can each be adjusted to achieve the targeted 800° C. maximum. Cathode gas is circulated through a closed-loop flow path that includes recuperative heat exchangers, anode-cathode gas inlet heat exchangers, and a water-cooled gas chiller. A small fraction of the gas is vented from the flow loop to avoid buildup of contaminant gases (principally argon) that are likely present in the oxidant supply. In this embodiment water is used for gas cooling, which is the means by which waste heat is ultimately rejected to the surroundings; and absorption of carbon dioxide from the circulating anode gas.

While a 3-stage fuel addition approach has been described it is to be distinctly understood that the invention is not limited thereto but maybe alternatively configured to provide various other configurations and options including 1-stage and 2-stage options. The 3-stage option that has been provided because these offer high system efficiency, greater resistance to carbon deposition in the SOFC stacks 4 and adiabatic reactors, and an expectation of improved SOFC stack reliability.

This 3-stage configuration provides various advantages, first, the sensible heat in the 800° C. anode-exit gas from each of the three stacks is used to vaporize the added fuel and drive the endothermic reforming reaction. Because the anode gas between the exit of the first cell and entrance of the second cell is not cooled to be passed through the membrane 18 and recycle blower 28, the inefficiency associated with the anode gas recuperation are avoided. A similar efficiency gain is obtained due to the reuse of anode gas exiting the second stack and entering the third stack. As a result, a greater fraction of the heat generated in the stack can be utilized to drive the reforming reaction which increases the energy content of the fuel and improves efficiency.

Each set of three SOFC stacks 4 comprising each power-system module is positioned inside a well-insulated enclosure along with the adiabatic reforming reactors. The three SOFC stacks 4 are each designed to utilize approximately 60% of the fuel in the anode gas. The remaining 40% of the fuel continues on to either the next stack in the series or, in the case of the third stack in the series, is recycled to the entrance of the first stack. Because the fuel gas concentration in the anode gas becomes progressively more dilute as the gas goes from the first stack to the third, each stack in the series is somewhat larger than the last. In the current design, the second and third stacks 4 are roughly twice the size of the first stack.

The SOFC stacks generate sensible heat from the fraction of the Hz and CO oxidation energy not used to create electric power. Some of this is used to heat the anode feed gas, vaporize the fuel and drive the fuel-reforming reaction, so the "waste heat" carried away by the anode gas is used to improve system efficiency. Some of the heat is lost to ambient through the insulation layer, and some is consumed by on-stack reforming of methane in the anode feed gas, this upgrades the anode-gas fuel quality and thereby improves system efficiency. The remaining excess heat is carried away by the cathode gas (oxygen) flow, which is adjusted to maintain the desired maximum stack operating temperature of about 800° C. As shown in FIG. 1, the cathode-gas flow to each stack 4 can be independently controlled to ensure accurate control of each stack temperature. Even though the electrical conversion efficiency within the SOFC stack is in the range of 60 to 65% or less depending on cell voltage and anode-gas composition, the net system-level efficiency can exceed 70% because of the ways in which the "waste heat" is used to upgrade fuel quality (by steam reforming) and vaporize the liquid fuel.

As the 800° C. anode gas exits each stack 4, a small amount of S-8 fuel is added and rapidly mixed with the gas. The high gas temperature causes the fuel to vaporize and the rapid mixing is required to avoid localized high concentrations of fuel, which can lead to problematic carbon deposition. The gas exiting each SOFC stack contains sufficient steam and hydrogen to guard against carbon formation provided the gas is thoroughly and rapidly mixed with the S-8 fuel.

Upon vaporization of the fuel, the gas temperature decreases from 800° C. to about 700° C. The 700° C. gas mixture is fed to an adiabatic reforming reactor 8, which contains a proprietary, high-activity, steam-reforming catalyst. In an adiabatic reactor 8, heat is neither added to nor removed from the reacting gas stream. The reforming reaction is endothermic, so in the absence of external heat input, the gas temperature decreases as the reaction proceeds. The product gases exit the reforming reactors at about 570° C. The reforming reactors are sized to result in the conversion of >99% of the S-8 fuel to reformate fuel gases (i.e., $H_2$, CO, and $CH_4$). Preliminary estimates put the reactor size at roughly 0.5 liter per kW of SOFC output power.

Several heat exchangers are required for the power system. These include the anode-gas recuperator 32 three cathode-gas recuperators 10, three anode-cathode feed-gas heat exchangers 22, an anode gas cooler/condenser 13, and a cathode gas cooler 12. It has been found that microchannel heat exchangers offer very compact size even for low-pressure-drop, high-thermal-effectiveness designs.

A gas-separation membrane is used to selectively remove $CO_2$ from the recycled anode gas before it is reheated and fed to the first SOFC stack in the three-stage series. Polypropylene, microporous membrane-based gas/liquid contactors are used industrially to degas liquids (e.g., oxygen removal for corrosion control) and to dissolve gases into liquids (e.g., water carbonation for beverage manufacture). The membrane material is preferably highly hydrophobic with small (ca. 0.03 micron) pores. In one embodiment of the invention the membrane is formed into hollow fibers, which are assembled into a fiber bundle. One fluid (typically the gas) is directed through the inside of the fiber tubes while the other fluid (typically the liquid) flows around the outside of the tube bundle. The determined the rate of carbon dioxide absorption as a function of fluid flow rates, temperature, and membrane area.

Because of its hydrophobicity and small-diameter pores, the microporous membrane can withstand up to about 10 atm of pressure differential between the liquid and gas streams before liquid is able to penetrate the membrane and enter the gas flow. Gas pressures in the power system are conveniently adjusted by controlling the fuel-addition rate, anode-recycle blower speed, and the rate of oxygen addition to the cathode-gas recycle loop. Pressure tracking will reduce the parasitic load associated with pumping a coolant media such as water through the membrane system. Operation of the power system at higher pressure is expected to improve the performance of most system components, including the membrane and the SOFC.

In the preferred embodiment of the invention power may from the SOFC system may be stored in a battery bank such as a lithium-ion battery bank is utilized to provide spurts of power at a preselected time. Transfers of power between the system and the batteries and other mechanized portions of the device can be performed by standard high efficiency converter devices. In the embodiment selected for the present invention This converter will perform the power conversion at an efficiency of about 90%. Higher conversion efficiencies (up to approximately 97%) can be achieved through the use of larger, custom-designed power converters.

In some steam-reforming SOFC power systems, waste heat from the fuel cell is used to provide heat for water and fuel vaporization as well as heat to drive the endothermic fuel reforming reaction. A significant gain in system efficiency can be attained if an alternative, anode-recycle approach is used. In an anode-recycle reforming system, the anode gas is circulated through the SOFC anode using a high-temperature blower. Fuel is continuously injected into the anode exhaust just before the mixture reacts adiabatically over a catalyst. A small fraction (approximately 10%) of the circulating gas is vented to prevent the continuing buildup of a reaction products. The advantage of this approach is that the SOFC waste heat is not needed for water vaporization, and the result is more heat available for fuel vaporization and the steam-reforming reaction.

To maintain high efficiency and avoid carbon deposition, the fraction of anode gas purged from the recycle loop is kept at less than about 10%. As a consequence of this low purge rate, steam and $CO_2$ accumulate in the recycle loop and, effectively, reduce the concentrations of the fuel gases ($H_2$, CO, and $CH_4$). Reduced fuel-gas concentrations require larger SOFC stacks to achieve the same level of single-pass fuel utilization. Further, the high steam concentration can, under some conditions, cause a reduction in SOFC lifetime. These drawbacks can be largely overcome through the use of a gas-separation membrane designed to remove $CO_2$ from the circulating anode gas without removing a significant portion of the fuel gases. With each pass through the anode-gas recycle loop, most of the $H_2O$ is removed via a condenser and most of the $CO_2$ is removed via the gas-separation membrane. The returned to the SOFC anode is principally composed of fuel gases with relatively little $H_2O$ and $CO_2$. This approach can be further improved if the fuel addition is performed in multiple stages (as described in Section 6.1) rather than in a single step.

Figure 5:
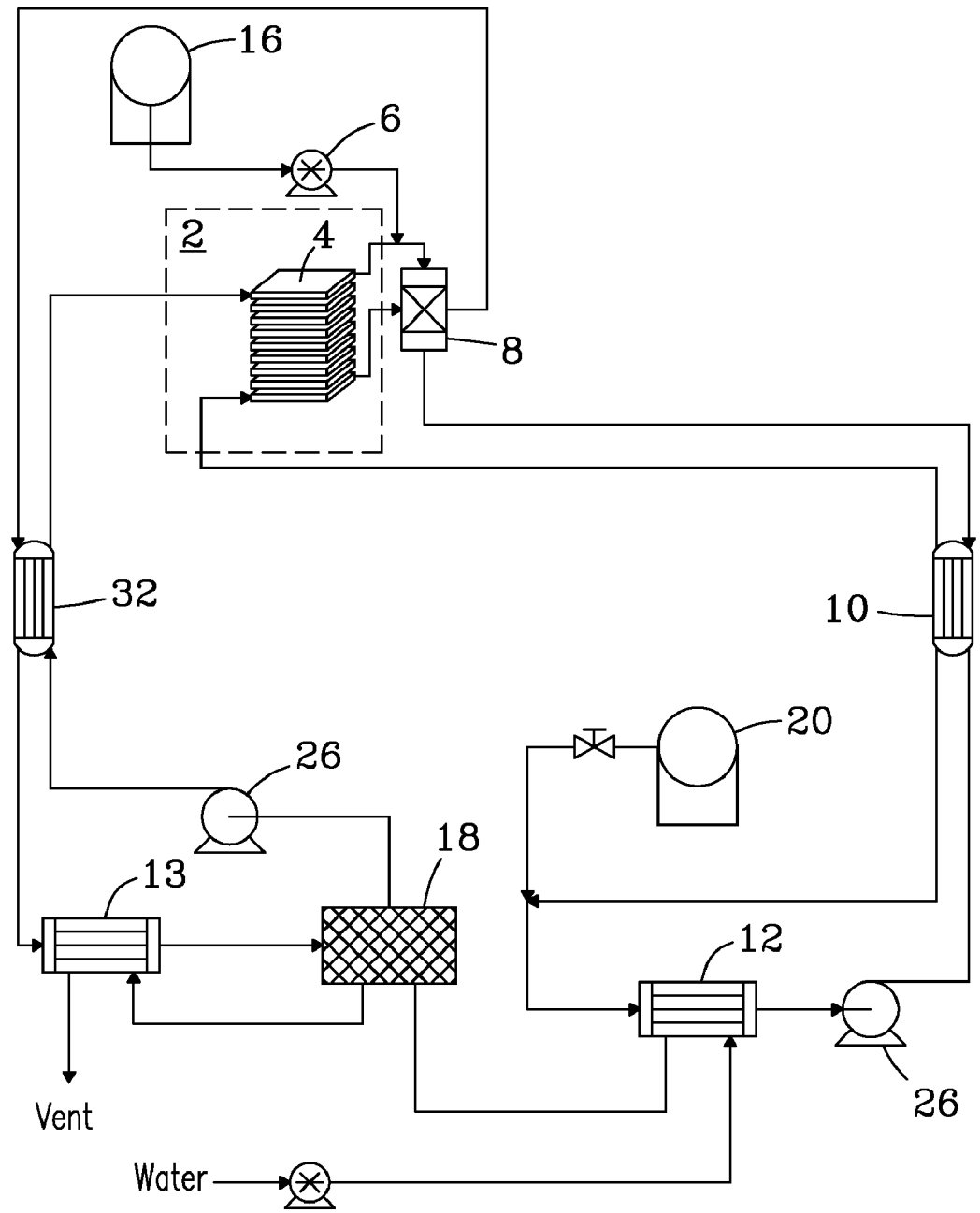
FIG. 5 shows a second embodiment of the preferred invention.

In many power-generation applications, the goal is to minimize the cost of power produced, which requires that increased fuel-cell efficiency and fuel-cost savings be traded off against the costs of a larger, more efficient fuel cell. In such applications, the optimal cell voltage is typically in the range of 0.6 to 0.75 volts, which results in reduced SOFC stack size, but also reduced net system efficiency. In the present invention high system energy density (including fuel and oxidant) is of paramount importance. This results in the optimum stack operating voltage being significantly higher. In the proposed system, the peak stack voltage is 0.85 volts, which yields considerably higher electrical-conversion efficiencies than the typical, lower-voltage applications. Because stack volume is such a small fraction of the total available system volume (it is about 2-3% of the total), the benefits of going to a larger, more efficient SOFC stack greatly outweigh the effects of the increased stack volume In one embodiment of the present invention the thermodynamic electrical conversion efficiency for 800° C. hydrogen at 0.6 volts is 46.6% and at 0.85 volts, the efficiency is 65.9%. Because the solubility of $CO_2$ in water is higher than the solubilities of the fuel gases, with each pass through the membrane a large fraction (90%) of the $CO_2$ dissolves in the water whereas only a small fraction (~6%) of the fuel gases dissolve. With this approach, the $CO_2$ can be removed from the anode-recycle gas without the reduced efficiency associated with complete loss of the fuel gases. Selective $CO_2$ removal without fuel-gas loss can also be accomplished by a gravity-driven, gas-absorption column in which water flows downward over a column packing material while the gas flows upward. Another embodiment of the invention is shown in FIG. 5. This configuration shows a simplified arrangement premised upon a single module stack.

While various preferred embodiments of the invention are shown and described, it is to be distinctly understood that this invention is not limited thereto but may be variously embodied to practice within the scope of the following claims. From the foregoing description it will be apparent that various changes may be made without departing from the spirit and scope of the invention as defined by the following claims.

What is claimed is:

1. A method for performing steam methane reforming in a Solid Oxide Fuel Cell Power System said method comprising the steps of:
    introducing fuel into a circulating anode gas downstream from a first SOFC stack;
    reacting said circulating anode gas adiabatically in an adiabatic steam reformer to form a mixture of hydrogen, carbon monoxide, methane and steam;
    feeding said circulating mixture as an anode feed into a second SOFC stack to create a reformate gas;
    converting carbon monoxide in said circulating reformate gas to carbon dioxide;
    removing said carbon dioxide from said circulating reformate gas;
    removing water from said circulating reformate gas; and
    introducing at least a portion of said circulating reformate gas to a third SOFC stack as a circulating anode gas; wherein less that 10% of said circulating anode gas is vented from said system.

2. The method of claim 1 wherein said circulating reformate gas is passed through three successive stacks before said carbon dioxide and water are removed.

3. The method of claim 1 wherein said carbon dioxide is removed from said circulating reformate gas by a microporous membrane.

4. The method of claim 1 wherein each of the second SOFC stack and the third SOFC stack is volumetrically larger than the first SOFC stack.

* * * * *

UNITED STATES PATENT AND TRADEMARK OFFICE
CERTIFICATE OF CORRECTION

PATENT NO. : 8,394,544 B2  
APPLICATION NO. : 12/118353  
DATED : March 12, 2013  
INVENTOR(S) : Lawrence A. Chick et al.

It is certified that error appears in the above-identified patent and that said Letters Patent is hereby corrected as shown below:

In the Specification

Column 1, line 48: Replace "beat" with "but"

Column 1, line 49: Insert --gas-- after "The"

Figure 2:
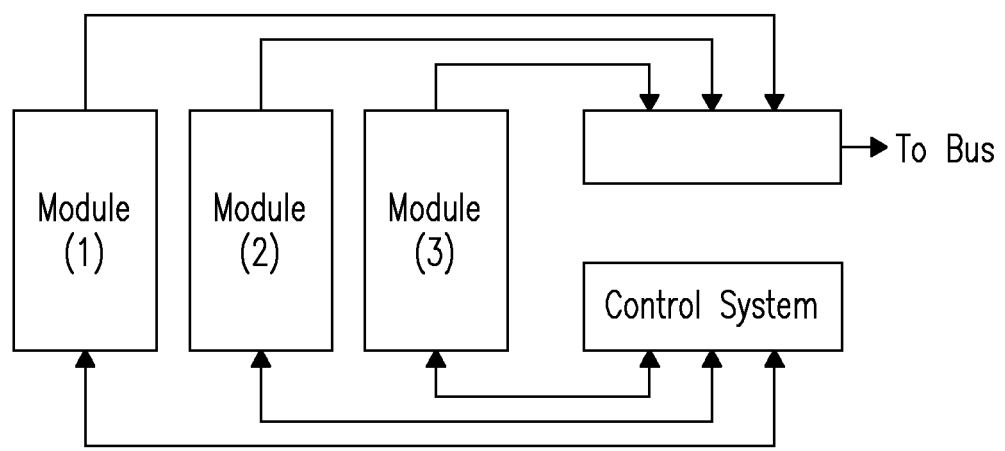
Figure 3:
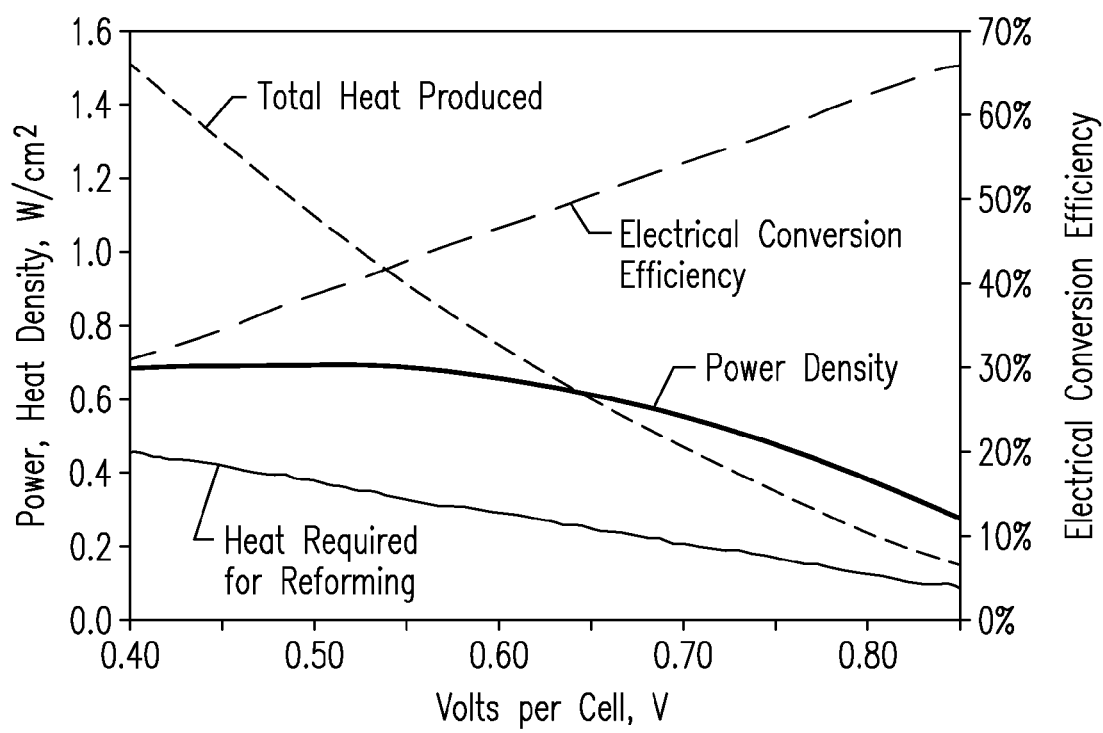
FIG. 3 shows a graph demonstrating the energy efficiency in the embodiment shown in FIG. 1.
Figure 4:
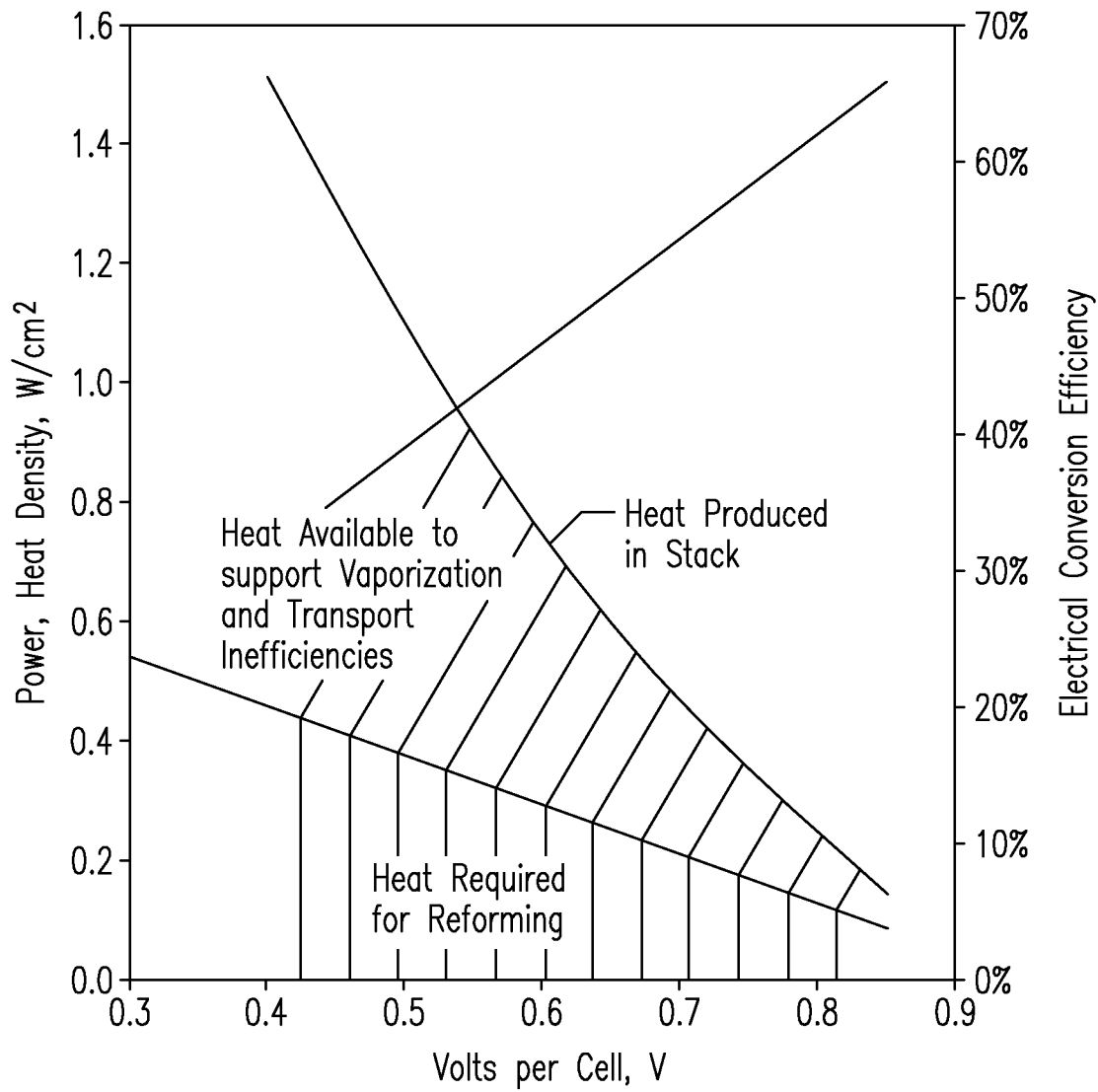
FIG. 4 shows a graph of the relative heats for various actions in the present system

Column 1, after line 56: Insert --FIG. 2 shows a schematic view of the stacked modules of one embodiment--

Signed and Sealed this
Thirteenth Day of May, 2014

Michelle K. Lee
*Deputy Director of the United States Patent and Trademark Office*